US011168725B2

(12) United States Patent
Ikada et al.

(10) Patent No.: US 11,168,725 B2
(45) Date of Patent: Nov. 9, 2021

(54) THERMOPLASTIC PLASTIC NUT, NUT WELDING DEVICE AND NUT WELDING METHOD

(71) Applicant: MITSUBISHI HEAVY INDUSTRIES, LTD., Tokyo (JP)

(72) Inventors: Akira Ikada, Tokyo (JP); Taichi Uehara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 327 days.

(21) Appl. No.: 16/082,003

(22) PCT Filed: Dec. 28, 2016

(86) PCT No.: PCT/JP2016/089154
§ 371 (c)(1),
(2) Date: Sep. 4, 2018

(87) PCT Pub. No.: WO2017/168908
PCT Pub. Date: Oct. 5, 2017

(65) Prior Publication Data
US 2020/0232498 A1    Jul. 23, 2020

(30) Foreign Application Priority Data

Mar. 31, 2016 (JP) ............................. JP2016-071486

(51) Int. Cl.
*F16B 33/00* (2006.01)
*B29C 65/00* (2006.01)
(Continued)

(52) U.S. Cl.
CPC ............ *F16B 33/006* (2013.01); *B29C 65/08* (2013.01); *B29C 65/561* (2013.01); *B29C 66/71* (2013.01)

(58) Field of Classification Search
CPC ........ F16B 33/00; F16B 33/006; B29C 65/00; B29C 65/08; B29C 65/50; B29C 65/56;
(Continued)

(56) References Cited

U.S. PATENT DOCUMENTS 2,923,339 A    2/1960  Skidmore
3,403,718 A *  10/1968 Hughes ................. F16B 37/122
                                            411/180
(Continued)

FOREIGN PATENT DOCUMENTS

EP          0272495 A1    6/1988
GB          2203118 A     10/1988
(Continued)

OTHER PUBLICATIONS

Extended European Search Report for European Application No. 16897123.2 dated Jan. 22, 2019; 8pp.
(Continued)

*Primary Examiner* — Jacob T Minskey
*Assistant Examiner* — Matthew Hoover
(74) *Attorney, Agent, or Firm* — Kanesaka Berner and Partners LLP

(57) ABSTRACT

A thermoplastic plastic nut includes a nut main section having a second thread to screw a first thread of a bolt; and a thin wall section weldable to the first thread and disposed to protrude upwardly from the nut main section. A material of the nut main section contains a thermoplastic resin and a material of the thin wall section contains the thermoplastic resin. Thus, a thermoplastic plastic nut, a nut welding device and a nut welding method are provided to make it possible to easily prevent the loosening of the nut.

11 Claims, 15 Drawing Sheets

(51) Int. Cl.
*B29C 65/08* (2006.01)
*B29C 65/56* (2006.01)

(58) Field of Classification Search
CPC ....... B29C 65/561; B29C 66/00; B29C 66/70; B29C 66/71
See application file for complete search history.

(56) References Cited

U.S. PATENT DOCUMENTS

| | | |
|---|---|---|
| 4,984,415 A | 1/1991 | Kuroda |
| 5,672,036 A | 9/1997 | Medal |
| 5,879,115 A | 3/1999 | Medal |
| 6,213,885 B1 | 4/2001 | Bachle |

FOREIGN PATENT DOCUMENTS

| | | |
|---|---|---|
| JP | H6-10935 A | 1/1994 |
| JP | H6-41928 U | 6/1994 |
| JP | H8-247128 A | 9/1996 |
| JP | 2001-501717 A | 2/2001 |
| JP | 2008-168437 A | 7/2008 |
| WO | 98/15744 A1 | 4/1998 |
| WO | 2011042326 A1 | 4/2011 |

OTHER PUBLICATIONS

Volkov S. S, "Joining thermoplastics with metallic and non-metallic materials", Welding International, Taylor & Francis, Abingdon, GB, vol. 27, No. 2, Jan. 1, 2013, pp. 163-166; 4pp.
IPRP of International Application No. PCT/JP2016/089154 dated Oct. 11, 2018; 6pp.

* cited by examiner

THERMOPLASTIC PLASTIC NUT, NUT WELDING DEVICE AND NUT WELDING METHOD

RELATED APPLICATIONS

The present application is a National Phase of PCT/JP2016/089154, filed Dec. 28, 2016, and claims priority based on Japanese Patent Application No. 2016-071486, filed Mar. 31, 2016.

TECHNICAL FIELD

The present invention relates to a thermoplastic plastic nut, a nut welding device and a nut welding method.

BACKGROUND ART

In a fastening mechanism using a bolt and a nut, a loosening prevention mechanism is sometimes provided to prevent the loosening of the nut during an operation for a long term range. For example, a cotter pin or a wire is sometimes used to prevent that a metal nut is loosened from a metal bolt. The cotter pin or the wire connects the metal bolt and the metal nut, and the connection prevents the loosening of the nut. However, when the cotter pin or the wire is applied after installation of the nut, a working step increases, and also the cost increases. As a substitution example, a technique is known in which an external force is acted on an external circumferential surface of the nut before installation of the nut, to plastically deform the nut (especially, a thread section of the nut). By using the nut having the plastically deformed thread, the loosening of the nut after installation of the nut is prevented. However, to install the nut having the plastically deformed thread, an additional torque becomes necessary. As a result, the installation work of the nut sometimes becomes difficult.

On the other hand, when a plastic bolt and a plastic nut are used, the nut is generally fixed to the bolt with an adhesive material after installation of the nut. However, in case of using the adhesive material, an adhesion performance changes mainly depending on a pure degree of the surface to which the adhesive material is applied. Therefore, the securing of the reliability of the adhesion is difficult. Also, when a delamination occurs in the adhesion part once, there is a problem that the loosening prevention mechanism loses all the functions.

As other loosening prevention techniques, a double nut, a Belleville spring washer, a nut with lock ring and so on are known. However, when the double nut is used, the number of parts increases and the cost increases. Also, twice of work quantity become necessary to the application of the nut. When the Belleville spring washer is used, an additional axis force is required for the Belleville spring. Therefore, when it is necessary to manage the torque and the axis force, it is difficult to use the Belleville spring washer. Also, the nut with a lock ring is complicated in the structure of nut itself. Therefore, when the nut with a lock ring is used, the manufacturing cost increases.

As the related technique, Patent Literature 1 discloses a nut with a circular cylinder section possible to transform, and a nut caulking tool. In Patent Literature 1, after the nut is fixed on an output axis, the transformable circular cylinder section is tightened up additionally by the caulking tool. The nut is caulking-fastened to the output axis by the additional tightening-up.

Also, Patent Literature 2 discloses a plastic fastener that is possible to melt. In Patent Literature 2, a nut with a prominent (an extending surface) is welded to a bolt with no thread and with a circular cylindrical surface. Thus, the nut is fixed on the bolt.

CITATION LIST

Patent Literature

[Patent Literature 1] CD-ROM data of JU 4-84340 (JP 6-41928U)
[Patent Literature 2] U.S. Pat. No. 5,672,036

SUMMARY OF THE INVENTION

An object of the present invention is to provide a thermoplastic plastic nut, a nut welding device and a nut welding method, in which it is possible to easily prevent the loosening of the nut.

This object and other objects, and benefits of the present invention could be easily confirmed by the following description and the attached drawings.

A thermoplastic plastic nut in some embodiments includes a nut main section having a second thread to screw a first thread of a bolt; and a thin wall section weldable to the first thread and disposed to protrude to a first direction along a central axis of the nut main section from the nut main section.

The material of the nut main section contains a thermoplastic resin, and the material of the thin wall section contains the thermoplastic resin.

In the above thermoplastic plastic nut, the thin wall section may have a plurality of thin wall pieces. The plurality of thin wall pieces may be arranged in intervals around the central axis.

In the above thermoplastic plastic nut, the thin wall section may be annular.

In the above thermoplastic plastic nut, an external side surface of the thin wall section may be a surface in which a distance from the central axis becomes small step-by-step or continuously along the first direction.

A nut welding device in some embodiments is a nut welding device used to weld a thermoplastic plastic nut to a first thread of a bolt. The nut welding device includes: a power supply section; and a welding device main section. The welding device main section includes a distant section having an inner surface contacting the external surface of an upper section of the nut; and an energy generating section configured to generate energy to be transmitted to the external side surface of the upper section of the nut. The inner surface is a surface in which a distance from the central axis of the welding device main section becomes small as heading upwardly.

In the nut welding device, the distant section may have a plurality of prominent pieces which are prominent for the central axis. Also, the welding device main section may supply the energy to the thermoplastic plastic nut through the plurality of prominent pieces.

In the nut welding device, the distant section may include a guide member configured to abut the external surface of the nut main section.

The nut welding device may further include: a rotation mechanism configured to rotate at least a part of the guide member around the central axis.

A nut welding method in some embodiments includes: installing a thermoplastic plastic nut to a thermoplastic plastic bolt; moving down a welding device main section such that the welding device main section contacts a nut upper section as an upper section of the thermoplastic plastic nut; and welding the nut upper section to the first thread of the thermoplastic plastic bolt by transmitting an energy to the nut upper section from the welding device main section.

In the nut welding method, the nut upper section may be a thin wall section configured to protrude upwardly from the nut main section.

According to the present invention, the thermoplastic plastic nut, the nut welding device and the nut welding method can be provided to make it possible to easily prevent the loosening of the nut.

DESCRIPTION OF EMBODIMENTS

Figure 1:
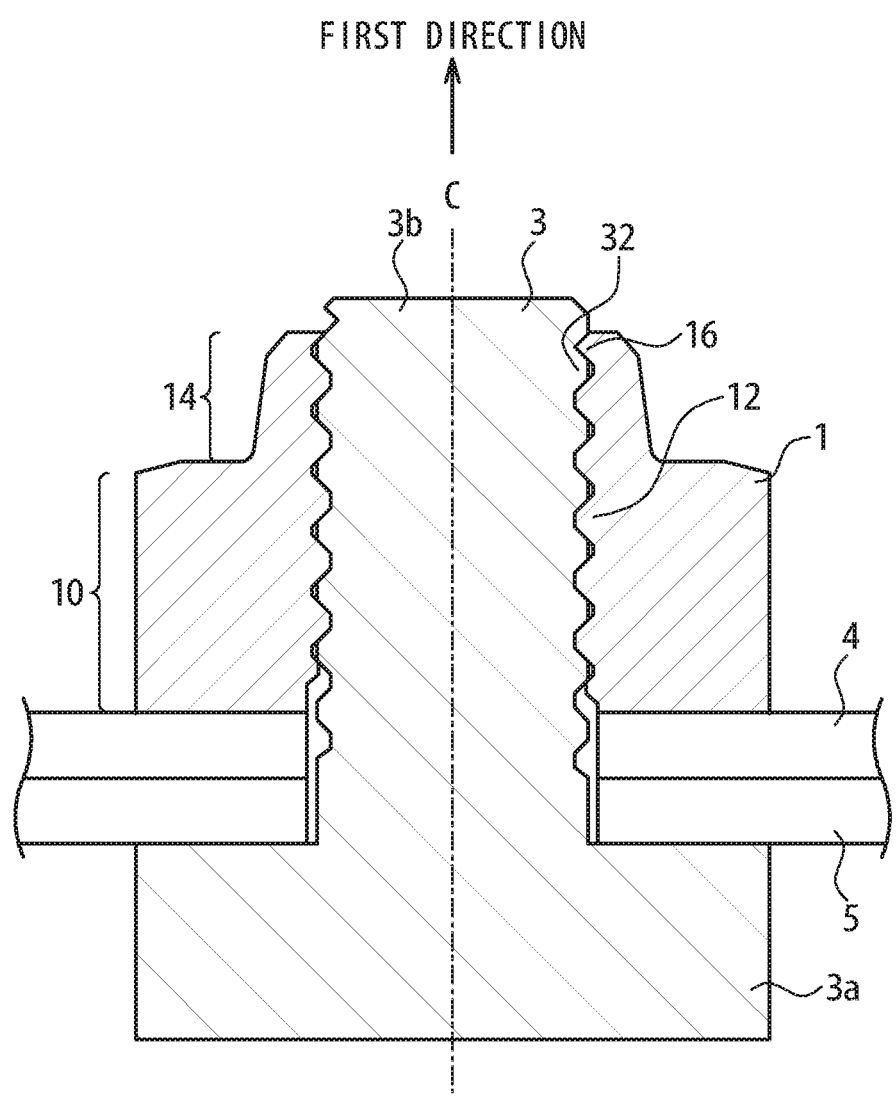
FIG. 1 is a schematic cross sectional view showing a state in which two fastened members are fastened by using a thermoplastic plastic nut and a bolt in an embodiment.

A thermoplastic plastic nut, a nut welding device and a nut welding method according to embodiments will be described below with reference to the attached drawings. Note that an identical reference numeral is assigned to a component having an identical function in the attached drawing. The repetitive description of the component having the identical reference numeral is omitted.

Definition of Terms

In the present Specification, a direction heading for a bolt axis section 3b from a bolt head 3a (in other words, a direction which is along a central axis of a nut main section and which heads for a thin wall section of the nut from the nut main section) is defined as "a first direction". In the present Specification, "an upper direction" corresponds to the first direction. That is, in the present Specification, even if the first direction and a vertically up direction do not coincide really, "the first direction" is defined as the upward direction. Also, in the present Specification, "a downward direction" means a direction opposite to "the upward direction".

(Thermoplastic Plastic Nut in Embodiment)

Referring to FIG. 1, a thermoplastic plastic nut 1 in an embodiment will be described. FIG. 1 is a cross sectional view schematically showing a state in which a fastened member 4 and a fastened member 5 are fastened by using the thermoplastic plastic nut 1 and a bolt 3.

Referring to FIG. 1, the thermoplastic plastic nut 1 has a nut main section 10 and a thin wall section 14. The thickness of thin wall section 14 in a direction perpendicular to the central axis C is thinner than the thickness of nut main section 10 in the direction perpendicular to the central axis C. Note that the central axis C is a central axis of the nut main section 10 and the central axis C coincides with the central axis of the bolt 3. The nut main section 10 has a second thread 12 that engages with a first thread 32 of the bolt 3 (e.g. a thermoplastic plastic bolt). By rotating the nut main section 10 around the central axis C relatively to the bolt 3, the first thread 32 of the bolt 3 and the second thread 12 of the nut main section 10 screw each other.

The thin wall section 14 protrudes upwardly from the nut main section 10. In other words, the thin wall section 14 protrudes to the first direction along the central axis C from the nut main section 10. Energy (vibration energy or thermal energy) is given to the thin wall section 14. At least a part of the thin wall section 14 melts (softens) by receiving the energy, to be weld to the first thread 32 of the bolt 3.

The material of nut main section 10 contains a thermoplastic resin, and the material of thin wall section 14 contains a thermoplastic resin. The material of nut main section 10 and the material of thin wall section 14 coincide with each other in an example shown in FIG. 1. The nut main section 10 and the thin wall section 14 are integrally molded or shaped. The material of nut main section 10 and thin wall section 14 is, for example, a poly ether ether ketone resin (PEEK resin).

In the embodiment, the nut main section 10 is formed of the thermoplastic resin. Therefore, the lightening of nut can be realized. Also, the thin wall section of the nut contains the thermoplastic resin. Therefore, by heating the thin wall section, the thin wall section softens easily, and the thin wall section of the nut can be welded to the bolt. As a result, the prevention of loosening of the nut can be realized. Also, because the heated part is the thin wall section, the energy necessary for the heating is enough less. Also, in the welding of the nut, a transformation quantity of the nut main section is enough less. Therefore, there is little generation of burr and free material and the outer appearance of the nut after the welding is good.

Figure 2:
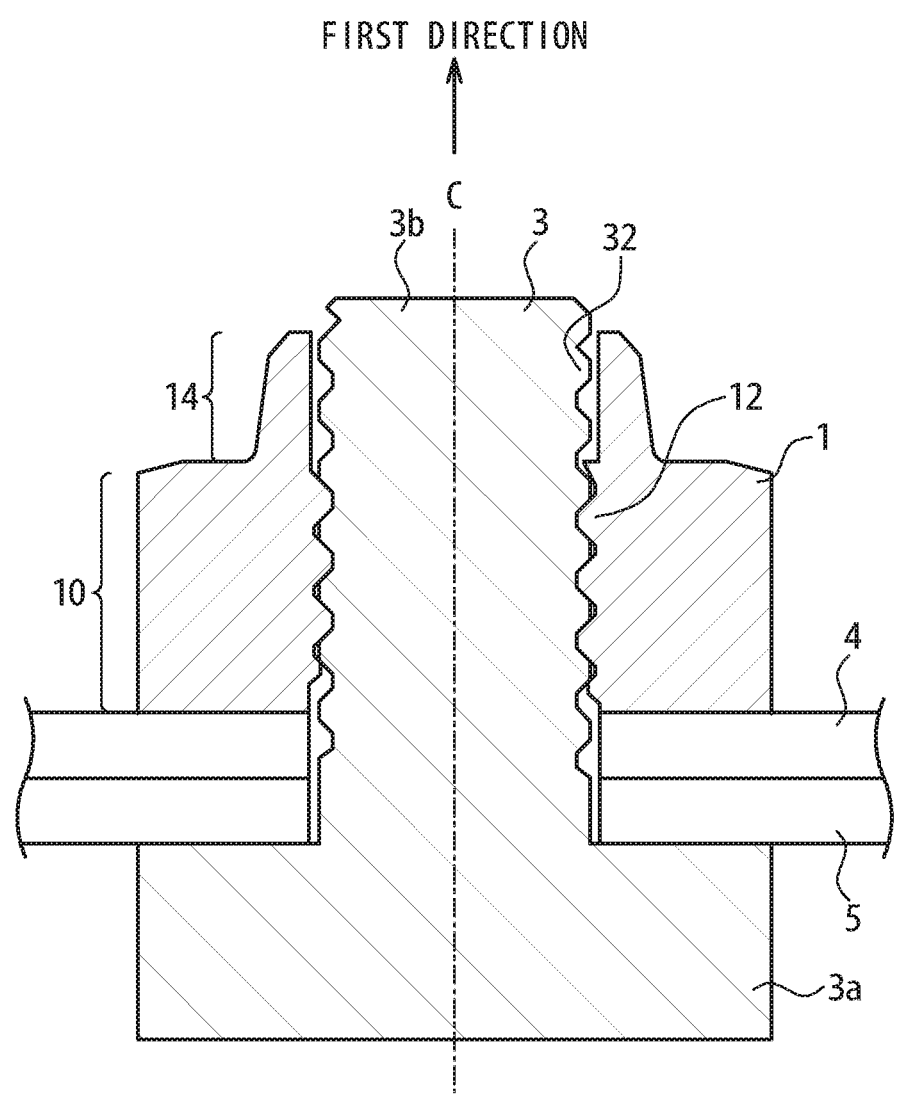
FIG. 2 is a schematic cross sectional view showing a state in which two fastened members are fastened by using a thermoplastic plastic nut and the bolt in the embodiment.

Note that in the example shown in FIG. 1, the fastened member 4 and the fastened member 5 are respectively the board members which are made from FRP (fiber reinforced plastics). However, the material and shape of fastened member 4 and fastened member 5 are optional. Also, in the example shown in FIG. 1, a thread (third thread 16) is provided for the thin wall section 14. However, as shown in FIG. 2, any thread does not have to be provided for the inner surface of the thin wall section 14. Alternatively, a thread is provided for the inner surface of a lower part of the thin wall section 14, but no thread is provided for the inner surface of an upper part of the thin wall section 14. When the third thread 16 is provided for the thin wall section 14, the thin wall section 14 becomes able to be welded to the first thread 32 of the bolt 3 in a little transformation quantity. Therefore, it is desirable that the third thread 16 is provided for the thin wall section 14.

Figure 3:
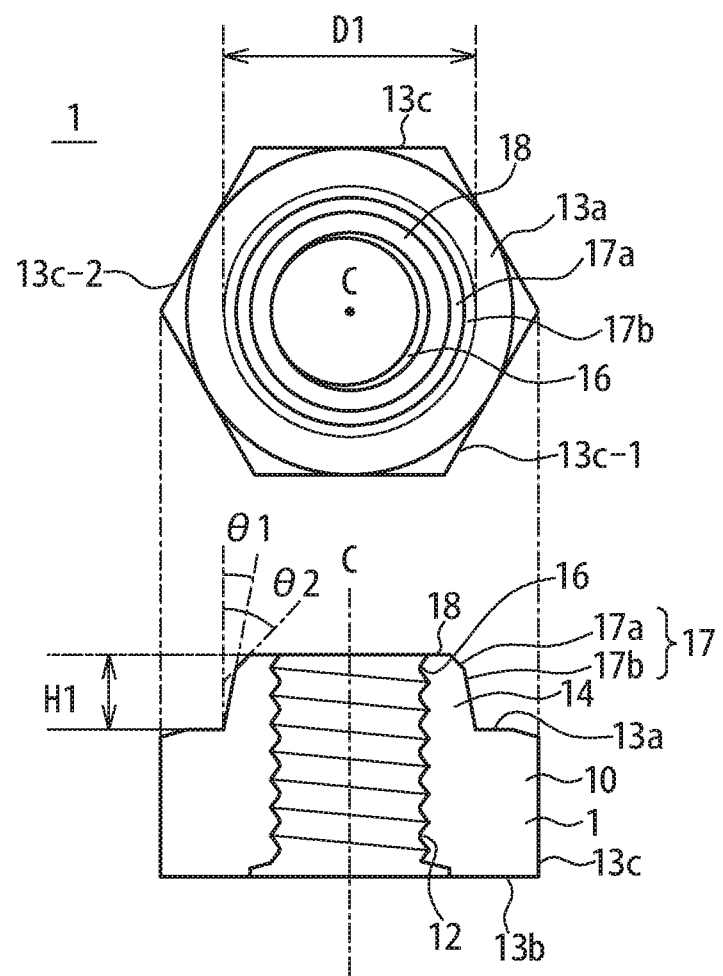
FIG. 3 is a diagram schematically showing the thermoplastic plastic nut in the embodiment.

Referring to FIG. 3, the thermoplastic plastic nut 1 in the embodiment will be described in detail. A plan view of the thermoplastic plastic nut 1 is shown in the upper-side of FIG. 3, and a side view of a virtual half body of the thermoplastic plastic nut 1 is shown in the lower-side of FIG. 3.

Referring to FIG. 3, the nut main section 10 has an upper surface 13a, a lower surface 13b and a side surface 13c in addition to the second thread 12 provided for the inner circumferential surface of the nut main section. The upper surface 13a configure a shoulder section of the nut. The upper surface 13a may function as a stopper section to limit a movement along the central axis C of the welding device main section 400 to be described later. The lower surface 13b is a flat planar surface and is a surface which contacts the fastened member. The side surface 13c is a surface engageable with a tool such as a wrench or a guide member 470 to be described later. The cross-sectional shape of the side surface 13c perpendicular to the central axis C is hexagonal.

In the example shown in FIG. 3, the thin wall section 14 is an annular thin wall section. The thin wall section 14 has the third thread 16 on the inner circumferential surface. The third thread 16 is a thread extending continuously from the second thread 12 of the nut main section 10. Also, in the example shown in FIG. 3, the thin wall section 14 has an external side surface 17 (i.e. an outer circumferential surface) and an upper surface 18.

Figure 5:
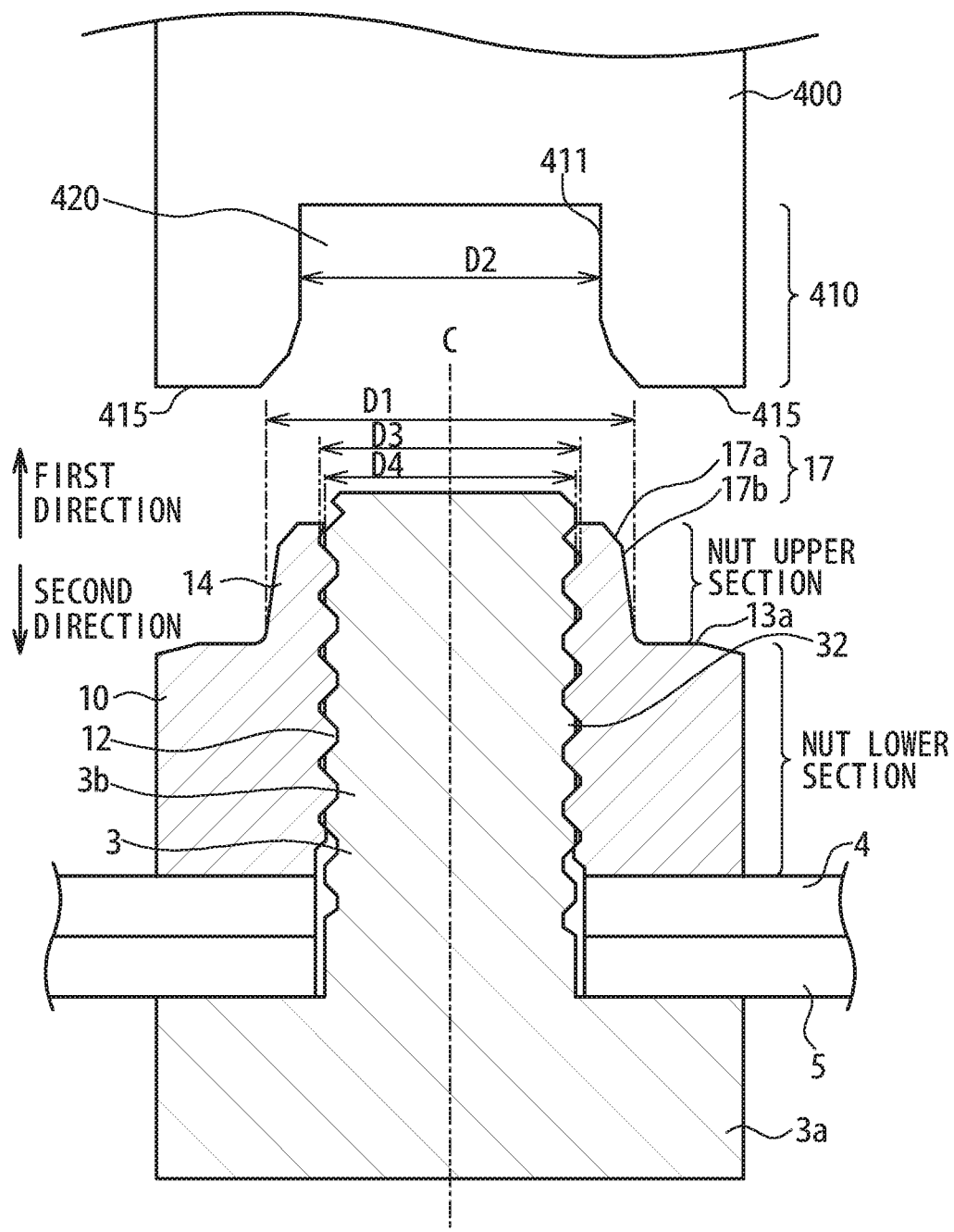
FIG. 5 is a schematic cross sectional view showing a state before the thermoplastic plastic nut is welded to the bolt.
Figure 6:
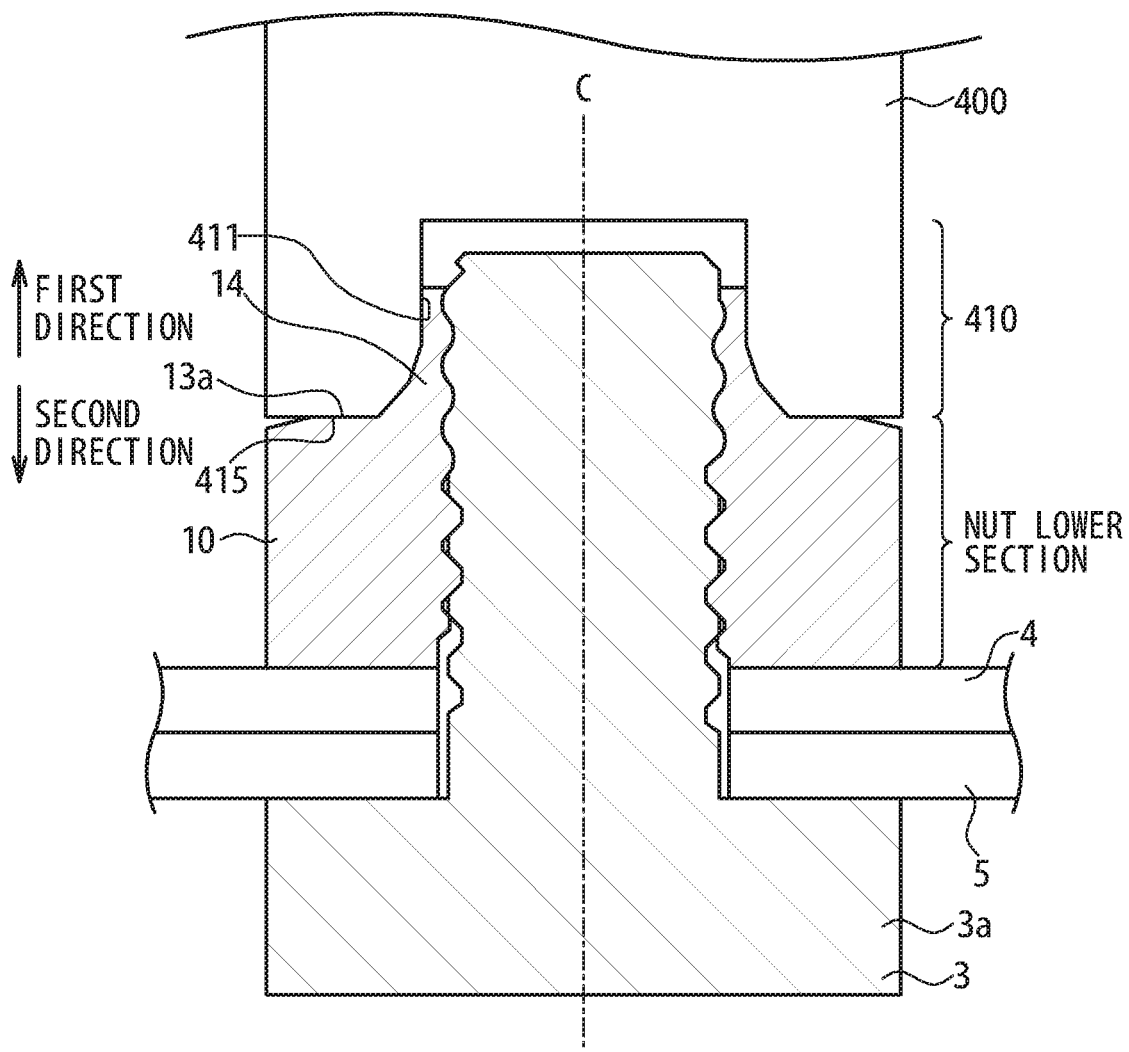
FIG. 6 is a schematic cross sectional view showing a state after the thermoplastic plastic nut is welded to the bolt.

The external side surface 17 is an annular surface which the welding device main section 400 to be described later contacts. More specifically, the external side surface 17 is the annular surface in which the distance between the central axis C and the external side surface 17 becomes small step-by-step or continuously as heading upwardly. In other words, the external side surface 17 is the annular surface in which the diameter becomes short as heading upwardly. For this reason, firstly, the positioning between the central axis of the welding device main section 400 and the central axis of the thin wall section 14 becomes easy, when the welding device main section 400 is moved to the second direction opposite to the first direction. Also, secondly, a melting object region increases gradually without increasing rapidly as the welding device main section 400 moves to the second direction, as shown in FIG. 5 and FIG. 6. Therefore, the movement of welding device main section 400 can be smoothly executed. Thirdly, the welding device main section 400 contacts the external side surface to apply to the thin wall section 14, a pressure in the direction heading for the central axis C. Therefore, the welding of the thin wall section 14 to the bolt 3 is promoted. As described above, the external side surface is the annular surface in which the distance from the central axis C to the external side surface becomes small as heading upwardly. Therefore, the above-mentioned at least three effects are played as the synergy effect.

Also, in the example shown in FIG. 3, as an angle between the external side surface 17 and the central axis C (i.e. an inclination angle) becomes large step-by-step as heading upwardly. Note that the inclination angle is an angle between the tangent to the external side surface 17 and the central axis C in a cross section which passes the central axis C. In the example shown in FIG. 3, the external side surface 17 has an upper-side inclination surface 17a and a lower-side inclination surface 17b. The inclination angle 82 of the upper-side inclination surface 17a is larger than the inclination angle 81 of the lower-side inclination surface 17b. Since the angle between the external side surface 17 and the central axis C (the inclination angle) is set to become large step-by-step as heading upwardly, the external side surface 17 becomes easy to be stored in an central concave section 420 (reference to FIG. 5) of the welding device main section 400. Also, since the welding device main section 400 contacts an upper portion of the external side surface 17 (e.g. the upper-side inclination surface 17a) at an early stage, the positioning between the central axis of the welding device main section 400 and the central axis of the thin wall section 14 is promptly carried out.

Alternatively, the angle between the external side surface 17 and the central axis C (i.e. the inclination angle) may become large continuously, as heading upwardly. That is, the cross section (the cross section which passes the central axis C) of the external side surface may contain a curve. Alternatively, the cross section (the cross section which passes the central axis C) of the external side surface may contain a curve and a straight line.

The height H1 of the thin wall section 14 (in other words, a distance between the upper surface 18 of the thin wall section 14 and the upper surface 13a of the nut main section 10) is, for example, from the width of one thread (in other words, one pitch of the second thread 12, that is, a distance by which the nut moves along the central axis C when the nut is rotated around the central axis C for one rotation) to the width of five threads (in other words, five pitches of the second thread 12, that is, five times of the distance by which the nut moves along the central axis C when the nut is rotated around the central axis C for one rotation). There is a fear that the welding area becomes insufficient when the height H1 is smaller than the width of one thread. Also, when the height H1 is larger than the width of five threads, there is a fear that the welding device main section 400 cannot be smoothly guided because the inclination angle of the external side surface becomes small. Also, there is a possibility that a prominent quantity of the thin wall section 14 from the upper surface 13a of the nut main section is excessive, when the height H1 is larger than the width of five threads. As a result, there is a possibility that the thin wall section and the bolt axis section 3b to which the thin wall section is welded stand in the way. Also, the maximum value of thickness of the thin wall section 14 (in other words, (the maximum external diameter D1 of the thin wall section 14—the lower surface diameter of the thin wall section 14)/2) is, for example, equal to or less than $2/3$ of the thickness of the nut (in other words, (the width between two surfaces of the nut main section 10–the lower surface diameter of the nut main section 10)/2). Note that "the distance between two surfaces" is a distance between opposing two surfaces of hexagon (a distance between first side surface 13c-1 and the second side surface 13c-2 in FIG. 3).

(Nut Welding Method in Embodiment)

Figure 4:
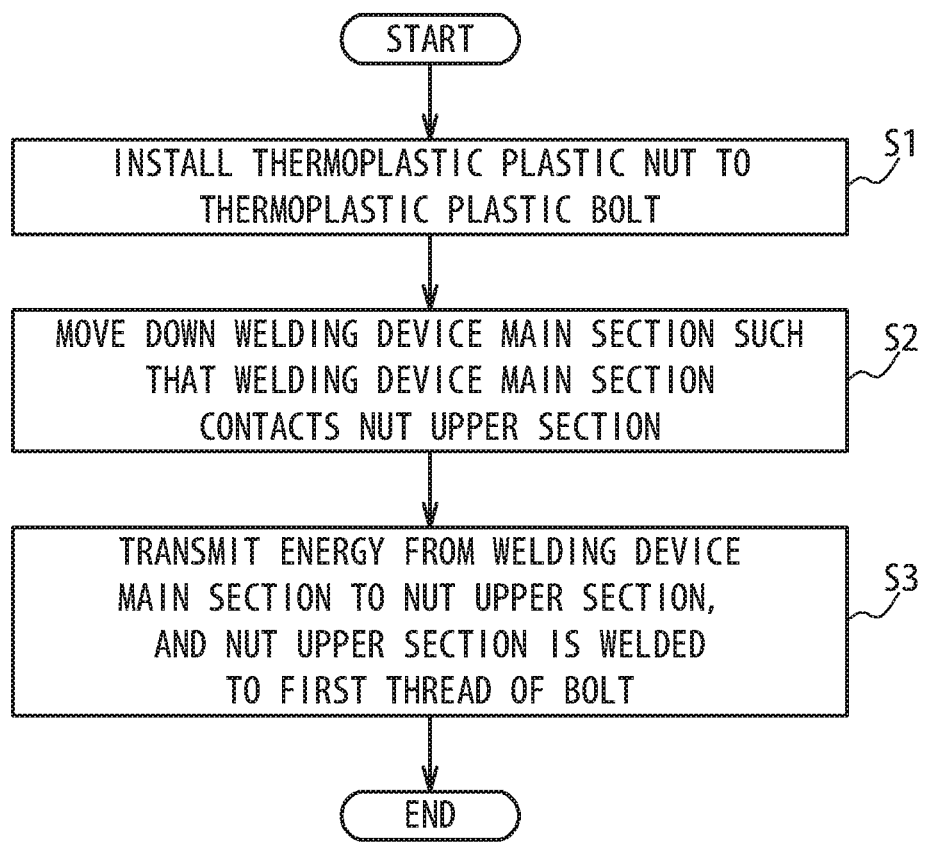
FIG. 4 is a flow chart showing a nut welding method.

Referring to FIG. 4 to FIG. 6, a nut welding method will be described. FIG. 4 is a flow chart showing the nut welding method. FIG. 5 is a cross sectional view schematically showing a state before the thermoplastic plastic nut 1 is welded to the bolt 3. FIG. 6 is a cross sectional view schematically showing a state after the thermoplastic plastic nut 1 is welded to the bolt 3.

Referring to FIG. 4 and FIG. 5, the thermoplastic plastic nut 1 is installed to the thermoplastic plastic bolt 3 at first step S1.

At second step S2, referring to FIG. 5 and FIG. 6, the welding device main section 400 is moved down so that the welding device main section 400 contacts a nut upper section as the upper section of the thermoplastic plastic nut 1.

At third step S3, energy is transmitted to the nut upper section from the welding device main section 400, so that the nut upper section is welded to the first thread 32 of the bolt 3. More specifically, at the third step S3, energy is transmitted to the external side surface of the nut upper section from the distant section 410 of the welding device main section 400. Also, at the third step S3, a pressure is applied to the external side surface of the nut upper section through the inner surface 411 of the distant section 410 of the welding device main section 400 to a direction heading for the central axis C of the nut main section 10. The pressure is generated due to the shape of inner surface 411 of the welding device main section 400. The specific shape of inner surface 411 will be described later.

Note that in an example shown in FIG. 5, what contacts the inner surface 411 of the distant section 410 at the second step S2 and at the third step S3 is only the nut upper section, and the nut lower section does not contact the inner surface 411 of the distant section 410. Therefore, the outer appearance of the nut lower section is almost maintained and the outer appearance of the nut after the welding is good.

Figure 7:
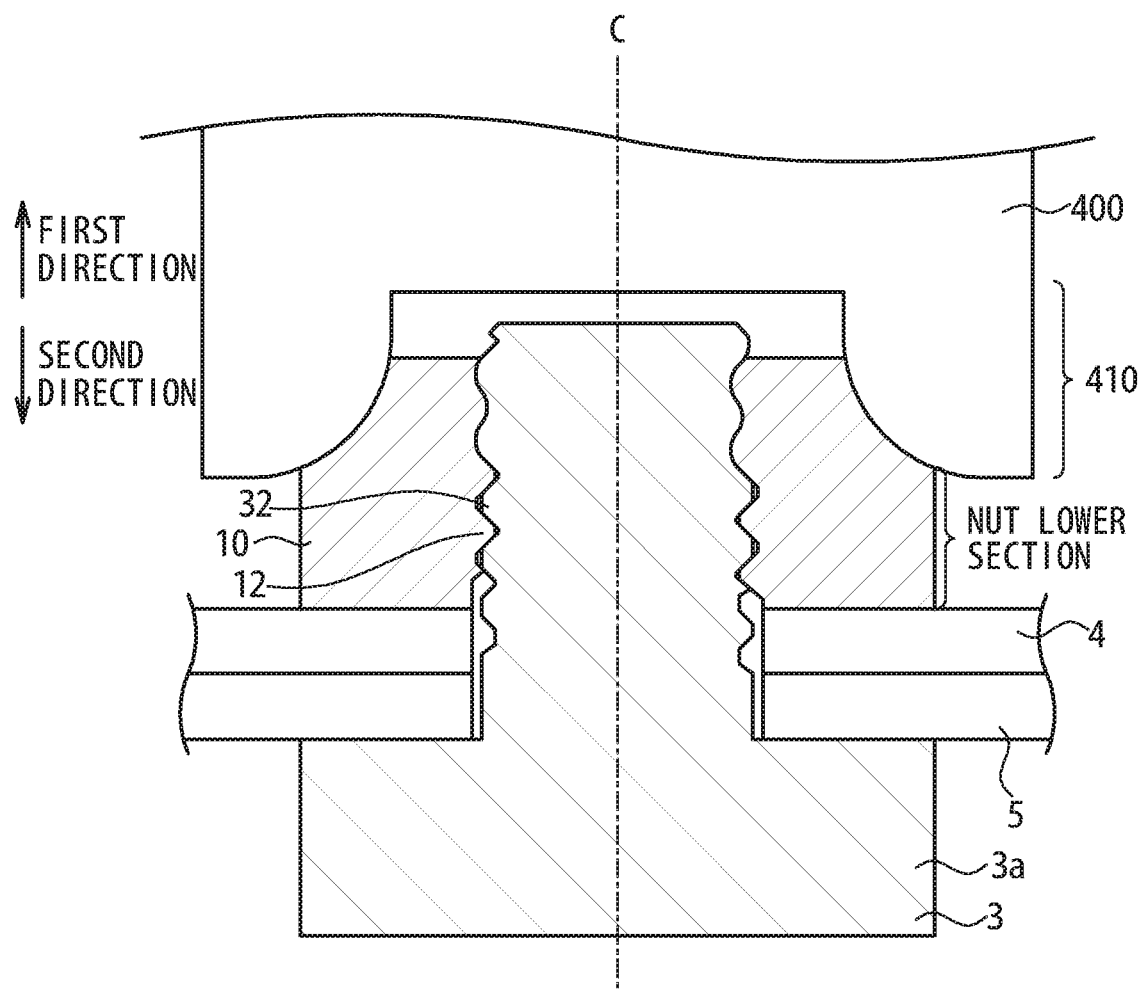
FIG. 7 is a schematic cross sectional view showing a state after the thermoplastic plastic nut is welded to the bolt.

In the example shown in FIG. 5 and FIG. 6, the nut lower section is the nut main section 10, and the nut upper section is the thin wall section 14 protruding upwardly from the nut main section 10. Also, the external side surface of the nut upper section is the external side surface 17 of the thin wall section 14. Alternatively, as shown in FIG. 7, the nut upper section may be the upper portion of the nut main section 10 and the nut lower section may be the lower portion of the nut main section 10. However, in the example shown in FIG. 7, the transformation quantity of the nut main section is large and the outer appearance is not good. Therefore, the example shown in FIG. 5 and FIG. 6 is more desirable than the example shown in FIG. 7.

Referring to FIG. 5 again, the minimum diameter D2 of the inner surface 411 of the distant section 410 of the welding device main section 400 will be described. The minimum diameter D2 of the inner surface 411 which is brought into contact with the external side surface 17 of the thin wall section 14 is smaller than the maximum external diameter D1 of the external side surface 17 of the thin wall section 14. Therefore, the external side surface 17 of the thin wall section 14 and the inner surface 411 of the welding device main section 400 contact surely, and the energy becomes able to be supplied to the thin wall section 14 through the inner surface 411. Note that in the example shown in FIG. 5, the minimum diameter D2 of the inner surface 411 is larger than a distance D3 (thread section external diameter) between the valley sections of the second thread 12 of the nut main section 10. Therefore, a risk is small that the inner surface 411 directly contacts the first thread 32 of the bolt 3. In this case, a transformation quantity of the first thread 32 of the bolt 3 decreases and the outer appearance after the welding of thermoplastic plastic nut 1 is good. Alternatively, the minimum diameter D2 of the inner surface 411 may be smaller than an external diameter D4 (a thread section external diameter) of the first thread 32 of the bolt 3. In this case, since the inner surface 411 directly contacts the first thread 32 of the bolt 3, the first thread 32, too, is melted (softened) surely. As a result, prevention of the loosening of the thermoplastic plastic nut 1 from the bolt 3 becomes surer.

Referring to FIG. 5, the distant section 410 of the welding device main section 400 has a distant end surface 415 possible to contact the upper surface 13a of the nut main section 10. The distant end surface 415 is an annular end surface. By moving the distant section 410 of the welding device main section 400 to the second direction, the distant end surface 415 is brought into contact with the upper surface 13a of the nut main section 10. The distant section 410 of the welding device main section 400 is positioned through the contact. As a result, the melting range (the softening range) of the thermoplastic plastic nut 1 by the welding device main section 400 is limited suitably.

(Nut Welding Device in Embodiment)

Next, the nut welding device 40 will be described with reference to FIG. 8. A schematic cross sectional view of the nut welding device is shown in an upper part of FIG. 8, and a bottom view of the welding device main section 400 is shown in a lower part of FIG. 8.

Figure 8:
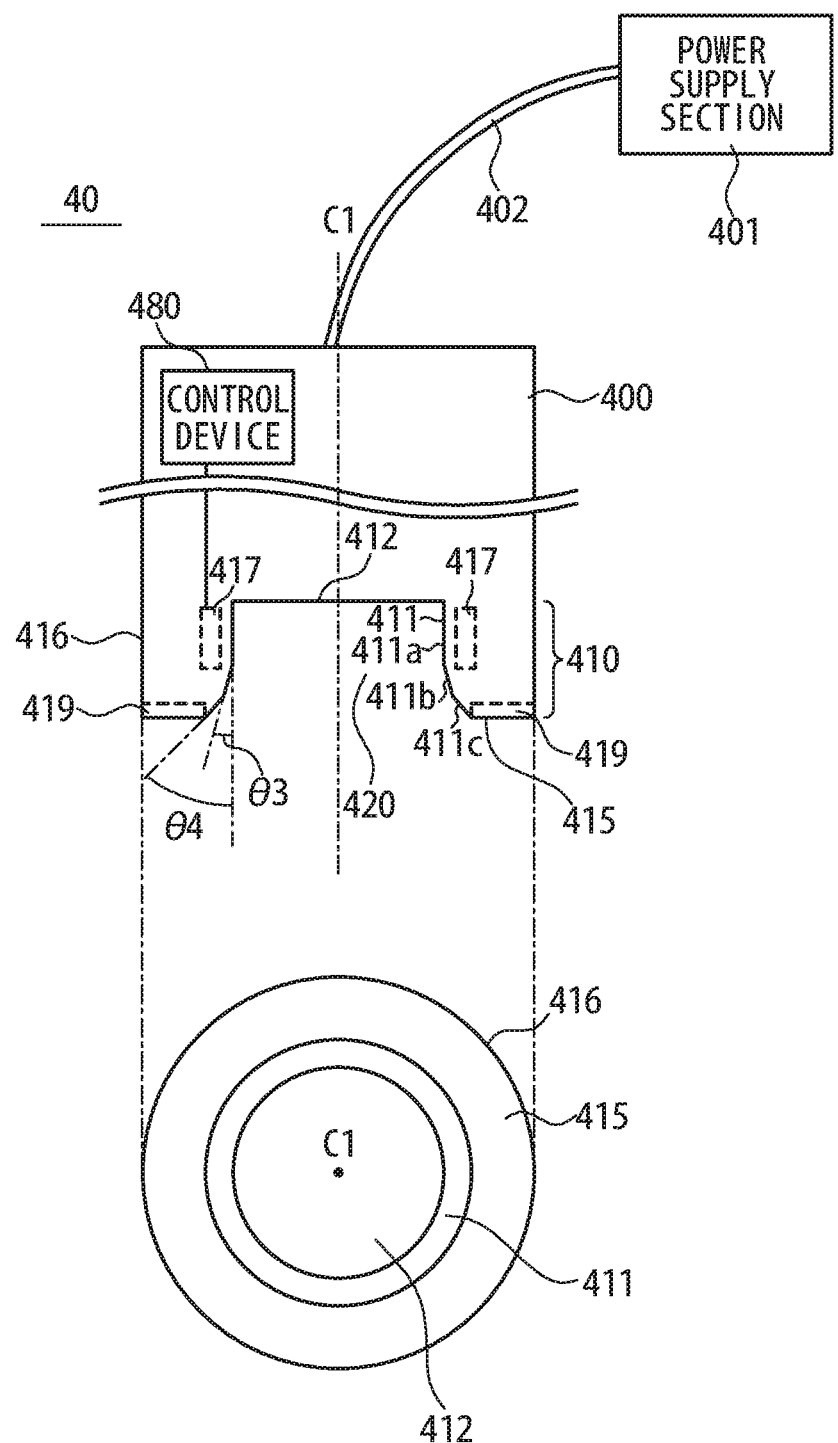
FIG. 8 is a diagram schematically showing a nut welding device in an embodiment.

Referring to FIG. 8, the nut welding device has the welding device main section 400 and a power supply section 401. In an example shown in FIG. 8, the welding device main section 400 and the power supply section 401 are connected through a power cable 402. Alternatively, the welding device main section 400 may have a power supply section such as a battery.

The welding device main section 400 has the distant section 410 to contact the thermoplastic plastic nut 1. In the example shown in FIG. 8, a central concave section 420 is provided for the distant section 410. The central concave section 420 houses or stores an end section of the bolt axis section 3b and a part of thermoplastic plastic nut 1 in use of the nut welding device 40.

The distant section 410 has the inner surface 411, a central concave section bottom surface 412, the distant end surface 415 and an external surface 416. The inner surface 411 is a surface contacting the external side surface of the nut upper section (for example, the external side surface of the thin wall section 14) in use of the nut welding device 40. The distant section 410 has an energy generating section 417 which generates the energy to be transmitted to the external side surface of the nut upper section. For example, the energy generating section 417 is a heater, a supersonic oscillator and so on. In the example shown in FIG. 8, the energy generating section 417 is arranged to face the inner surface 411. Alternatively or additionally, the whole distant section 410 may be the energy generating section 417 (e.g. the supersonic oscillator).

In the example shown in FIG. 8, the inner surface 411 is a surface in which the distance from the central axis C1 of the welding device main section 400 becomes small as heading upwardly (as heading for the proximal section of the welding device main section 400 from the distant section of the welding device main section 400). In other words, the inner surface 411 has a surface in which the diameter decreases step-by-step or continuously as heading upwardly. Therefore, it becomes easy to guide the thermoplastic plastic nut 1 inside the central concave section 420. Also, when the external side surface of the thermoplastic plastic nut 1 (for example, the external side surface of the thin wall section 14) contacts the inner surface 411, a pressure to a direction of the central axis is given to the external side surface of the thermoplastic plastic nut 1. As a result, the welding of the thermoplastic plastic nut 1 to the bolt 3 becomes surer.

Also, in the example shown in FIG. 8, the angle (the inclination angle) between the inner surface 411 and the central axis C1 becomes small step-by-step or continuously, as heading upwardly. Note that the inclination angle is an angle between the tangent to the inner surface 411 and the central axis C1 in the cross section which passes the central axis C1. In the example shown in FIG. 8, the inner surface 411 has a first inner surface 411a (an upper-side inner surface), a second inner surface 411b (a middle inner surface) and a third inner surface 411c (a lower-side inner surface). The inclination angle of the first inner surface 411a (0 degrees in the example shown in FIG. 8) is smaller than the inclination angle θ3 of the second inner surface 411b. Also, the inclination angle θ3 of the second inner surface 411b is smaller than the inclination angle θ4 of the third inner surface 411c. Therefore, in the example shown in FIG. 8, it becomes easier to guide the thermoplastic plastic nut 1 into the central concave section 420.

In the example shown in FIG. 8, each of the second inner surface 411b and the third inner surface 411c is an annular tapered surface. Alternatively, the inner surface 411 may be a curved surface in which the diameter increases in a trumpet shape as heading downwardly.

In the example shown in FIG. 8, a nut protection member 419 is arranged to face the distant end surface 415. The nut protection member 419 is a member to prevent energy from being transmitted to the upper surface 13a of the thermoplastic plastic nut 1. The nut protection member 419 may be, for example, a heat insulating member to prevent thermal energy from being transferred to the upper surface 13a, or a buffering member (e.g. elastic member) to prevent vibration energy from being transmitted to the upper surface 13a. The nut protection member 419 is arranged in a part of the welding device main section 400 which contacts the upper surface 13a of the thermoplastic plastic nut 1, to restrain the transmission of unnecessary energy to a part that does not contribute to the welding. As a result, the outer appearance of the nut after the welding is improved.

(First Modification Example of Nut Welding Device)

Figure 9:
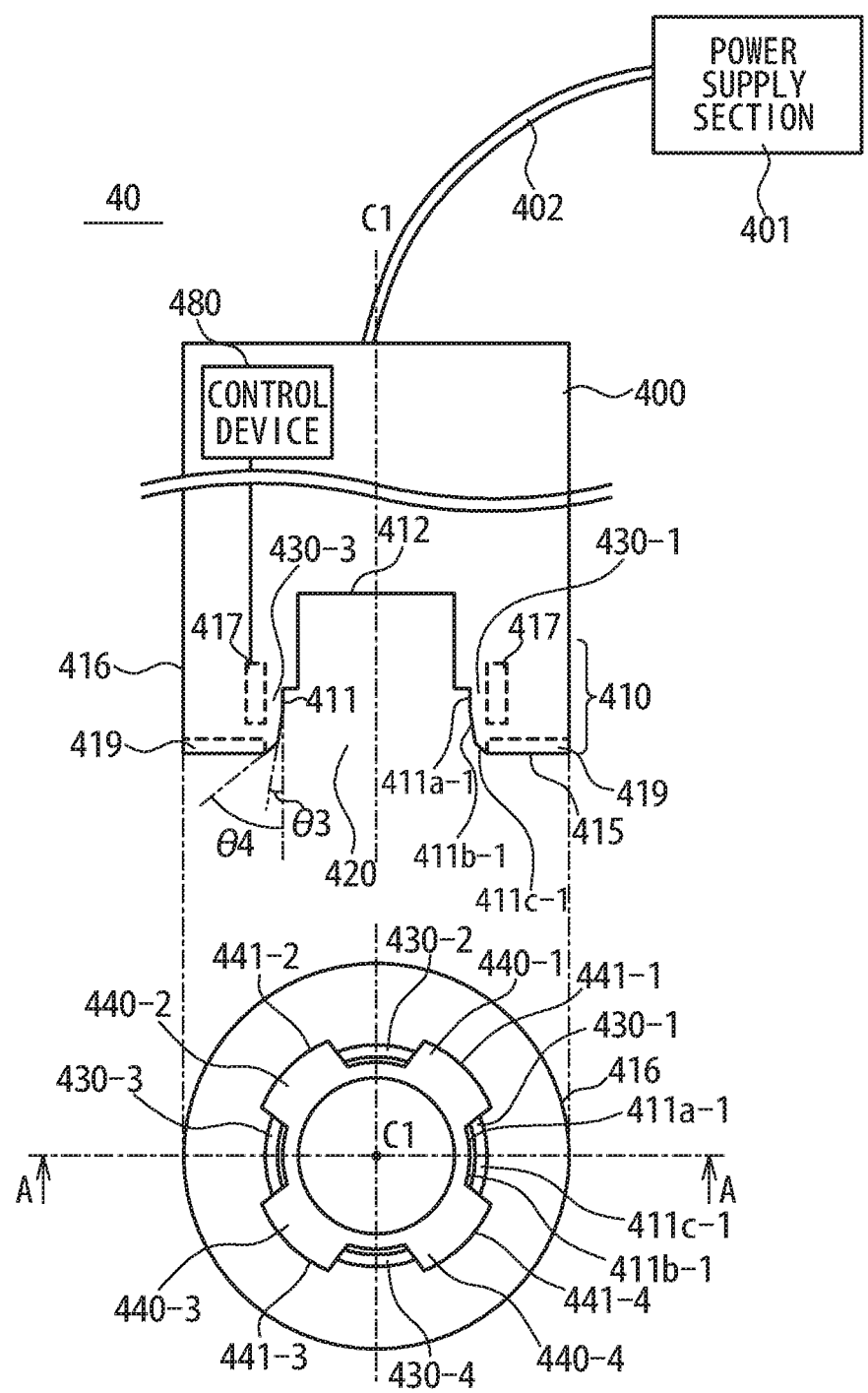
FIG. 9 is a diagram schematically showing the nut welding device of a first modification example.
Figure 10:
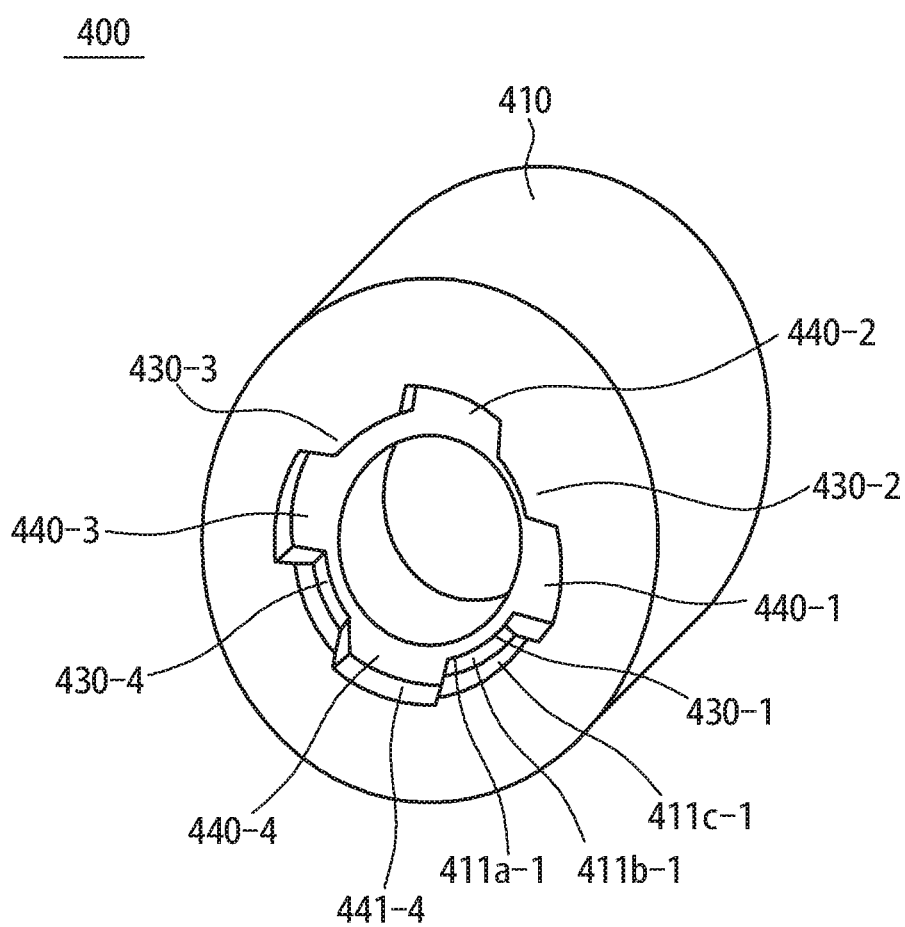
FIG. 10 is a schematic perspective view when the welding device main section is viewed from a diagonally lower direction.

Referring to FIG. 9 and FIG. 10, a first modification example of the nut welding device 40 will be described. The schematic cross sectional view of the nut welding device (A-A cross sectional view on the lower-side of FIG. 9) is shown in the upper-side of FIG. 9. A bottom view of the welding device main section 400 is shown on the lower-side of FIG. 9. Also, FIG. 10 is a schematic perspective view when the welding device main section 400 is viewed from an obliquely lower side.

In the nut welding device 40 of the first modification example, the shape of the distant section 410 of the welding device main section 400 is different from the shape of the distant section 410 of the nut welding device 40 shown in FIG. 8. In the other points, the nut welding device 40 of the first modification example is same as the nut welding device 40 shown in FIG. 8.

In the distant section 410 of the example shown in FIG. 9, a part of the inner surface 411 retreats to a direction to leave from the central axis C1. That is, a plurality of prominent sections 430 (a first prominent section 430-1, a second prominent section 430-2, a third prominent section 430-3, a 430-4 fourth prominent section and so on) which are prominent for the central axis C1 are provided for the distant section 410. The plurality of prominent sections 430 are arranged in intervals around the central axis C1. Note that it is desirable that the plurality of prominent sections 430 are arranged at equal intervals around the central axis C1. Also, the concave section 440 is provided between the adjacent prominent sections to define the surface retreated to a direction to leave from the central axis C1. In the example shown in FIG. 9, the plurality of concave sections 440 (a first concave section 440-1, a second concave section 440-2, a third concave section 440-3, a fourth concave section 440-4, and so on) are arranged around the central axis C1 in intervals. The plurality of concave sections 440 may be arranged in equal intervals around the central axis C1.

The prominent sections 430 are a part contacting the thin wall section 14 of the thermoplastic plastic nut 1 in nut welding. On the other hand, the bottom surfaces 441-1 to 441-4 of the concave sections 440 (in other words, the parts of the inner surface 411 retreated to the direction to leave from the central axis C1) are a portion which does not contact the thin wall section 14 of the thermoplastic plastic nut 1 or a portion in which the contact is restrained, in nut welding. Therefore, when the number of prominent sections 430 is N (N is an optional natural number equal to or more than 1), energy is supplied to the thermoplastic plastic nut 1 from the welding device main section 400 through the N prominent sections 430. The thermoplastic plastic nut 1 is welded to the bolt 3 at the N parts. In the example shown in FIG. 9, the contact area between the inner surface 411 of the welding device main section 400 and the thin wall section 14 of the thermoplastic plastic nut 1 becomes small, compared with the example shown in FIG. 8. Therefore, a transformation quantity of the thin wall section 14 in the nut welding becomes small, and the outer appearance after the nut welding is good.

In the example shown in FIG. 9 and FIG. 10, the number of prominent sections 430 is four, but the number of prominent sections 430 may be one, two, three or equal to or more than five. However, when the number of the prominent sections is equal to or more than five, equal to or more than seven, or equal to or more than nine, there is a fear that the area of the welding part formed by each prominent section becomes small. As a result, there is a fear that the thin wall section becomes easy to delaminate from the bolt 3 after the welding. Also, when the number of prominent sections is one, the arrangement of the prominent section is forced to become asymmetry to the central axis C1. From the above viewpoints, the number of prominent sections 430 is desirably from two to eight, more desirably from two from six, and further more desirably from two to four.

The inclination angle of the inner surface of the prominent section 430 may be same as the inclination angle of the inner surface 411 in the example shown in FIG. 8. That is, the angle between the inner surface of prominent section 430 and the central axis C1 (the inclination angle) may become small step-by-step or continuously, as heading upwardly. For example, the inclination angle of a first inner surface 411a-1 (0 degrees in the example shown in FIG. 9) may be smaller than the inclination angle θ3 of a second inner surface 411b-1. Also, the inclination angle θ3 of the second inner surface 411b-1 may be smaller than the inclination angle θ4 of a third inner surface 411c-1.

(Second Modification Example of Nut Welding Device)

Figure 11:
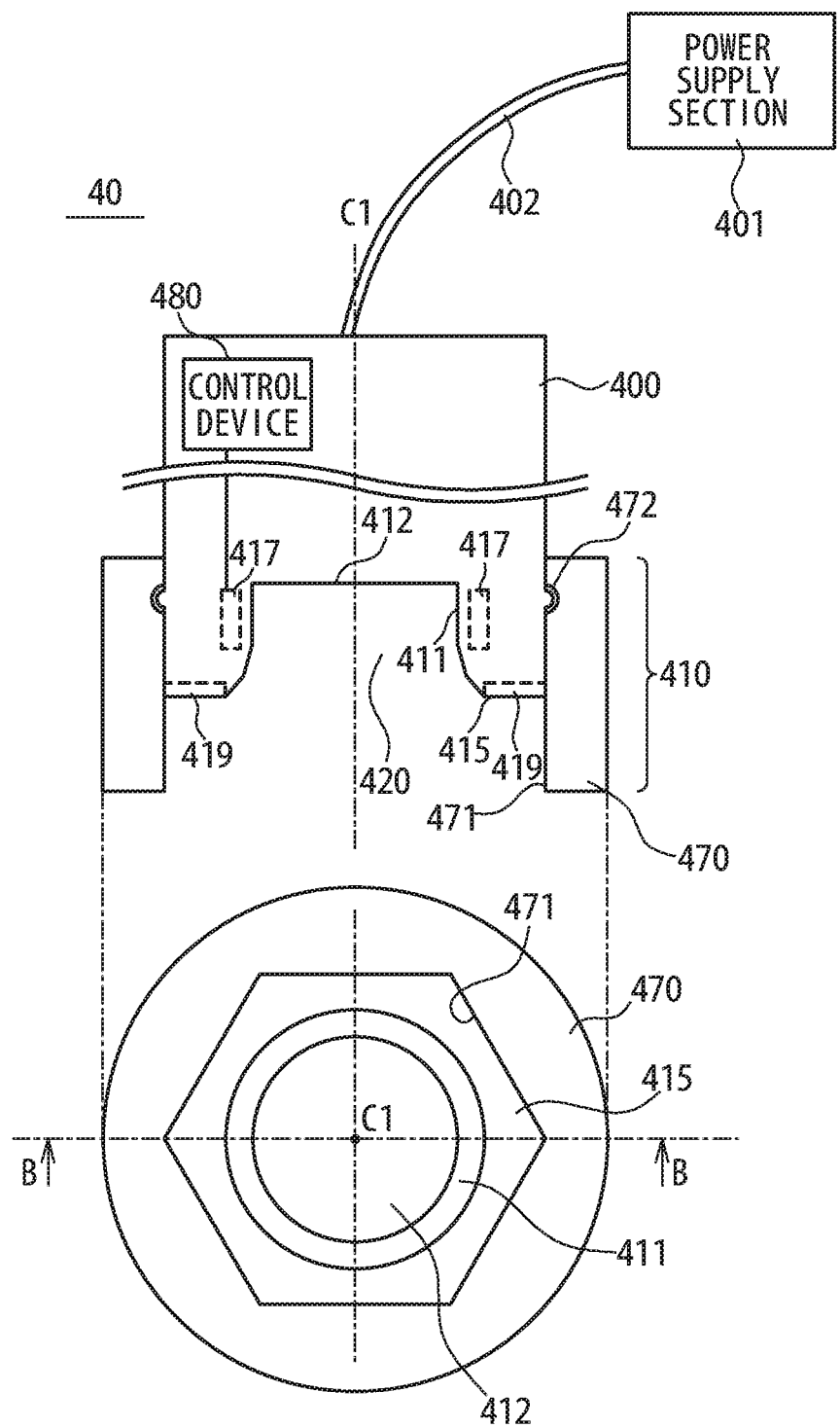
FIG. 11 is a diagram schematically showing the nut welding device of a second modification example.

Referring to FIG. 11, a second modification example of the nut welding device 40 will be described. The schematic cross sectional view of the nut welding device (B-B cross sectional view on the lower-side of FIG. 11) is shown on the upper-side of FIG. 11. The bottom view of the welding device main section 400 is shown on the lower-side of FIG. 11.

The example shown in FIG. 11 is different from the example shown in FIG. 8 in the point that the guide member 470 is provided for the distant section 410 of the welding device main section 400. In the other point, the example shown in FIG. 11 is same as the example shown in FIG. 8.

The guide member 470 has a guide member inner surface 471. The guide member inner surface 471 has a shape complementary to the shape of the external side surface of the nut main section 10. Therefore, it becomes possible to make the central axis C1 of the welding device main section 400 and the central axis of the thermoplastic plastic nut 1 coincide, by arranging the guide member 470 outside the nut main section 10. Moreover, the nut main section 10 becomes able to be used as a wrench to rotate the thermoplastic plastic nut 1.

In the example shown in FIG. 11, the guide member 470 is installed to the welding device main section 400 through an optional engaging mechanism 472. That is, the guide member 470 may be an attachment member which can detach from the welding device main section 400. Alternatively, the guide member 470 and the welding device main section 400 may be firmly stuck, or the guide member 470 and the welding device main section 400 may be integrally shaped.

Note that the first modification example and the second modification example may be combined. That is, in the nut welding device of the second modification example, the distant section 410 may have a plurality of prominent sections 430 which are prominent for the central axis C1.

(Third Modification Example of Nut Welding Device)

Figure 12:
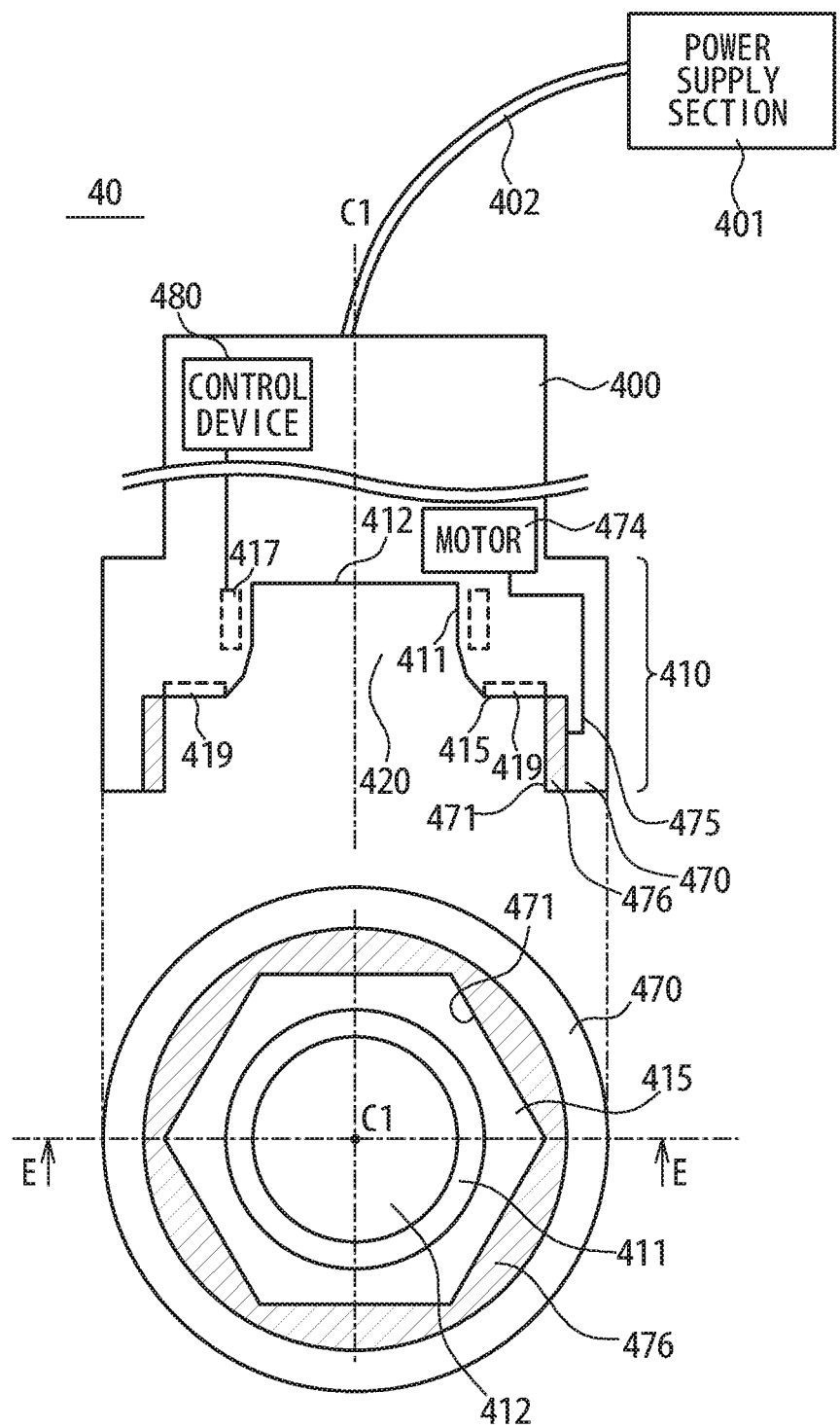
FIG. 12 is a diagram schematically showing the nut welding device of a third modification example.

Referring to FIG. 12, a third modification example of the nut welding device 40 will be described. A schematic cross sectional view of the nut welding device (E-E cross sectional view on the lower-side of FIG. 12) is shown on the upper-side of FIG. 12, and a bottom view of the welding device main section 400 is shown on the lower-side of FIG. 12.

The example shown in FIG. 12 is different from the example shown in FIG. 11 in the point that the nut welding device 40 has a rotation mechanism to rotate the guide section of the guide member 470. In the other point, the example shown in FIG. 12 is same as the example shown in FIG. 11.

In the example shown in FIG. 12, the welding device main section 400 has a guide section 476 having the guide member inner surface 471, and the rotation mechanism to rotate the guide section 476. For example, the rotation mechanism has a motor 474 and a driving force transmission mechanism 475 such as a gear. The driving force transmission mechanism 475 transmits the driving force from the motor 474 to the guide section 476 to rotate the guide section 476 around the central axis C1. Through the rotation of the guide section 476, the thermoplastic plastic nut 1 can be attached to the bolt 3. After the attachment of the thermoplastic plastic nut 1, the rotation of the guide section 476 stops. After that, by driving the energy generating section 417, energy is given to the thermoplastic plastic nut 1. As a result, the thermoplastic plastic nut 1 is welded to the bolt 3.

In the example shown in FIG. 12, the fastening of the thermoplastic plastic nut to the bolt and the welding of the thermoplastic plastic nut to the bolt become possible through a series of operations by using the nut welding device 40.

In the example shown in FIG. 12, only a part of the guide member 470 (guide section 476) is possible to rotate around the central axis C1. Alternatively, the rotation of the whole guide member 470 around the central axis C1 may be possible. Also, the third modification example and the first modification example can be combined. That is, in the nut welding device of the third modification example, the distant section 410 may have the plurality of prominent sections 430 which are prominent for the central axis C1.

(Example of Energy Supply by Energy Generating Section)

As shown in FIG. 8 to FIG. 12, the nut welding device 40 may have the control device 480. The control device 480 controls the operation of energy generating section 417. For example, the control device 480 calculates an integrated value of the energy given to the thermoplastic plastic nut 1 from the welding device main section 400, and stops the operation of energy generating section 417 when the integrated value of energy exceeds a threshold value previously set.

Figure 13:
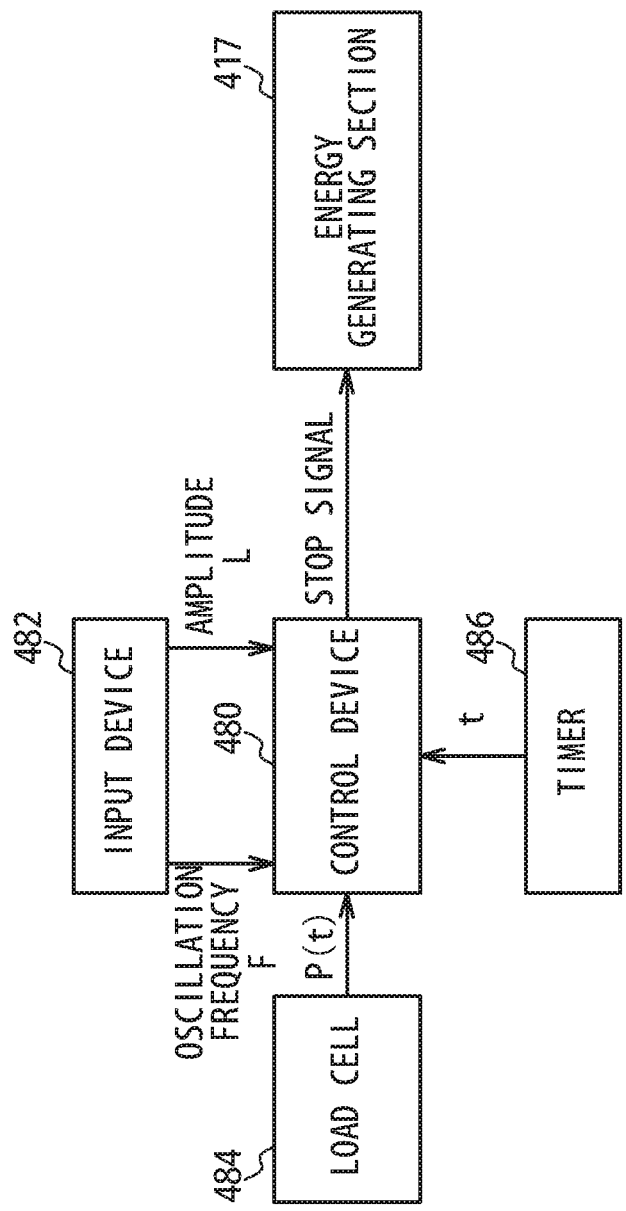
FIG. 13 is a functional block diagram schematically showing the control by a control device.

For example, it is supposed that the energy generating section 417 is a supersonic oscillator. Referring to FIG. 13, a value corresponding to a vibration frequency F, a value corresponding to amplitude L of the oscillator, a value corresponding to pushing force P acting on the thermoplastic plastic nut 1, and a value corresponding to time t are inputted to the control device 480. The vibration frequency F and the amplitude L may be set through an input device 482, or, they may be values fixed to the nut welding device 40. The pushing force P(t) may be measured by, for example, a load cell 484 which is arranged to face the inner surface 411 brought into contact with the thermoplastic plastic nut 1. Also, the time t may be measured by a timer 486. The work percentage W is determined from the production of P(t)× L×F. By integrating the work percentage W with respect to the time, the work J is determined. The control device 480 calculates the work J, and stops the operation of energy generating section 417, when the work J exceeds a threshold value previously set.

By configuring to automatically stop the operation of energy generating section 417 when the integrated value of energy exceeds the threshold value previously set, it is restrained that excess energy is given to the thermoplastic plastic nut 1.

When the energy generating section 417 is a heater, the integrated value of a heat quantity generated from the heater may be treated as the integrated value of energy. When the integrated value of energy exceeds the threshold value previously set, it is sufficient that the control device 480 controls to stop the operation of energy generating section 417.

(Thermoplastic Plastic Nut of First Modification Example)

Figure 14:
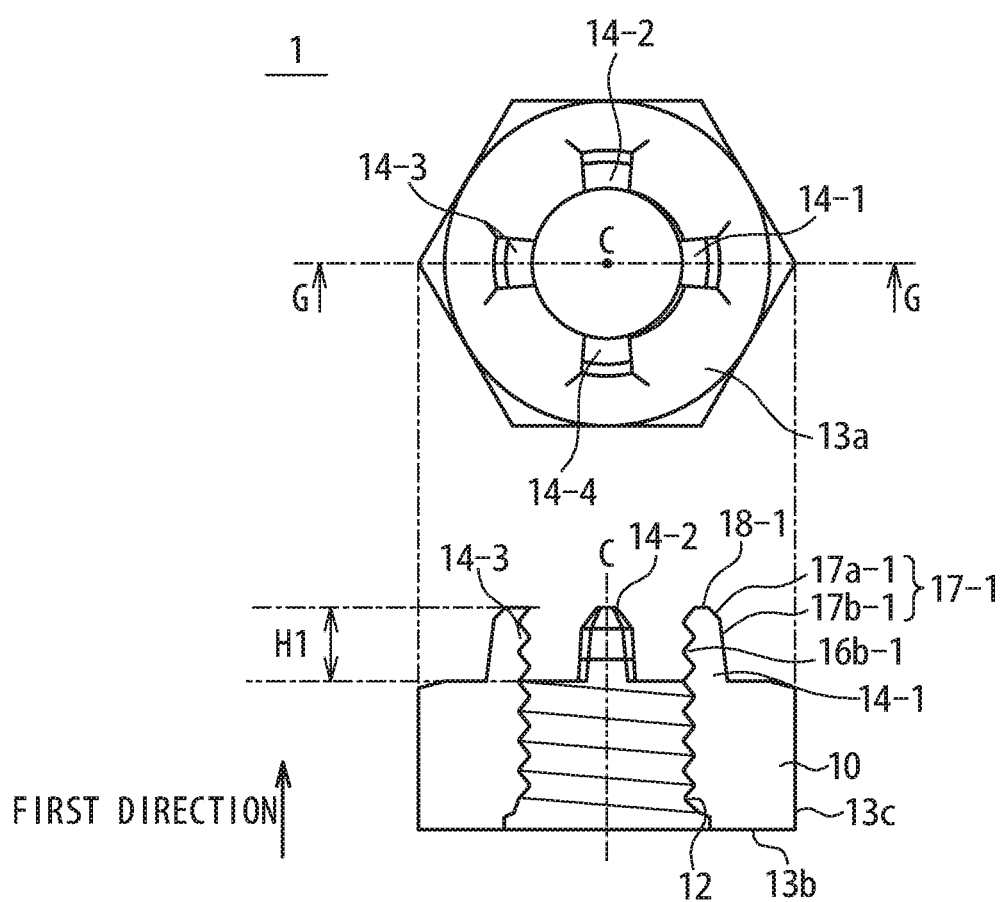
FIG. 14 is a diagram schematically showing the thermoplastic plastic nut of the first modification example.

Referring to FIG. 14, a first modification example of the thermoplastic plastic nut 1 will be described. A plan view of the thermoplastic plastic nut 1 is shown on the upper-side of FIG. 14, and a G-G cross sectional view of the thermoplastic plastic nut 1 is shown on the lower-side of FIG. 14.

The thermoplastic plastic nut 1 has the nut main section 10 and the thin wall section 14. The thickness of the thin wall section 14 in a direction perpendicular to the central axis C of the thin wall section 14 is thinner than the thickness of the nut main section 10 in a direction perpendicular to the central axis C of the nut main section 10. Since the configuration of the nut main section 10 is same as the configuration of the nut main section 10 in the above-mentioned embodiments (e.g. the reference to FIG. 1 to FIG. 3), the repetitive description is omitted.

In the example shown in FIG. 14, the thin wall section 14 has a plurality of thin wall pieces 14-1 to 14-4. In an example shown in FIG. 14, the number of thin wall pieces is four. However, the number of thin wall pieces may be one, two, three or equal to or more than five. However, when the number of thin wall pieces is one or two, it becomes difficult to guide the welding device main section 400 by using the thin wall pieces so that the central axis of the welding device main section 400 coincides with the central axis of the thin wall section 14. Also, when the number of the thin wall pieces is equal to or more than five, seven, or nine pieces, there is a fear that the welding area of each thin wall piece to the bolt 3 becomes small. As a result, there is a fear that each thin wall piece becomes easy to delaminate from the bolt 3 after the welding. From the above viewpoints, the number of thin wall pieces is, preferably from three to eight, more preferably from three to six, and further more preferably from three to four. Note that it is desirable that the plurality of thin wall pieces are arranged in equal intervals around the central axis C of the nut main section 10.

The configuration of thin wall piece 14-1 is same as the configuration of the other thin wall pieces (thin wall pieces 14-2, 14-3, 14-4 and so on). Therefore, the configuration of thin wall piece 14-1 will be described as the representative, and the description of the configuration of the other thin wall pieces is omitted. The thin wall piece 14-1 protrudes from the nut main section 10 for heading upwardly. In other words, the thin wall piece 14-1 protrudes to the first direction along the central axis C of the nut main section 10 from the nut main section 10. The energy (the vibration energy or the thermal energy) is given to the thin wall piece 14-1. At least a part of thin wall piece 14-1 is welded to the first thread 32 of the bolt 3 because receiving the energy so as to be melted (softened).

The material of thin wall piece 14-1 contains a thermoplastic resin (e.g. PEEK resin). In the example shown in FIG. 14, the material of thin wall piece 14-1 and the material of nut main section 10 are coincident with each other. The thin wall piece 14-1 and the nut main section 10 are integrally molded.

In the first modification example, since a part heated by the welding device main section 400 is the thin wall piece, a quantity of energy necessary for the heating is sufficiently small. Also, when the thin wall section contains a plurality of thin wall pieces, the pressure per unit area that acts on the thin wall section 14 from the welding device main section 400 becomes large, compared with a case that the thin wall section is an annular thin wall section. Also, if the thin wall section is an annular thin wall section, the compression stress in a circumferential direction is generated in the annular thin wall section, when the pressure acts on the thin wall section 14 from the welding device main section 400. The compression stress functions as the resistivity when the annular thin wall section 14 is transformed for the central axis C. On the other hand, the thin wall piece of the first modification example is easy to be transformed for the central axis C. From above viewpoint, in the first modification example, each thin wall piece is easy to dig into the inside of the first thread 32 of the bolt. As a result, the prevention of loosening of the thermoplastic plastic nut 1 becomes sure. Also, when the thin wall section contains the plurality of thin wall pieces, there is little melted (softened) volume in case of welding of the nut, compared with a case that the thin wall section is the annular thin wall section. Therefore, the outer appearance of the nut after the welding is good.

In the example shown in FIG. 14, a thread (third thread 16b-1) is provided for the thin wall piece 14-1 (another thin wall piece, too, is same). However, the thread does not have to be provided for the inner surface of the thin wall piece 14-1. Alternatively, a thread is provided on the inner surface of the lower region of the thin wall piece 14-1, and the thread does not have to be provided on the inner surface of the upper region of the thin wall piece 14-1.

In the example shown in FIG. 14, the thin wall piece 14-1 (the other thin wall piece, too, is same) has the external side surface 17-1 and the upper surface 18-1. The external side surface 17-1 is a surface which the welding device main section 400 contacts. More specifically, the external side surface 17-1 is a surface such that the distance from the central axis C becomes small step-by-step or continuously as heading upwardly. Therefore, firstly, when moving the welding device main section 400 in a second direction (a bottom direction), the positioning between the central axis of the welding device main section 400 and the central axis of the thin wall section 14 becomes easy. Also, secondly, as the welding device main section 400 moves to the second direction (the bottom direction), the melting object region does not increase rapidly but increases gradually. Therefore, the moving of the welding device main section 400 can be smoothly executed. Thirdly, the pressure to a direction heading for the central axis C is given to the thin wall piece 14-1 as the result of the welding device main section 400 contacting the external side surface 17-1. Therefore, the welding of the thin wall piece 14-1 to the bolt 3 is promoted. As above, the external side surface 17-1 is a surface in which the distance from the central axis C becomes small gradually as heading upwardly. Thus, the above-mentioned at least three effects are played as the synergy effect.

Also, in the example shown in FIG. 14, the angle between the external side surface 17-1 and the central axis C (i.e. the inclination angle) becomes large step-by-step as heading upwardly. Note that the inclination angle is an angle between the tangent to the external side surface 17-1 and the central axis C in the cross section which passes the central axis C. In the example shown in FIG. 14, the external side surface 17-1 has an upper-side inclination surface 17a-1 and a lower-side inclination surface 17b-1. The inclination angle of the upper-side inclination surface 17a-1 is larger than the inclination angle of lower-side inclination surface 17b-1. Since the angle between the external side surface 17-1 and the central axis C (the inclination angle) is set to become large step-by-step or continuously as heading upwardly, the external side surface 17-1 becomes easy to be stored in the central concave section 420 (referring to FIG. 5) of the welding device main section 400. Also, since the welding device main section 400 contacts the upper-side region of the external side surface 17-1 (e.g. upper-side inclination surface 17a-1) at an earlier stage, the positioning between the central axis of the welding device main section 400 and the central axis of the thin wall section 14 is promptly carried out.

Alternatively, the angle between the external side surface 17-1 and the central axis C (i.e. the inclination angle) may become large continuously as heading upwardly. That is, the cross section of the external side surface 17-1 (the cross section along a plane which passes the central axis C) may contain a curve. Alternatively, the cross section of the external side surface 17-1 (the section along a plane which passes the central axis C) may contain a curve and a straight line.

The height H1 of the thin wall section 14 (in other words, the distance between the upper surface 18-1 of the thin wall piece 14-1 and the upper surface 13a of the nut main section 10) is, for example, from the width for one thread (in other words, from one pitch of the second thread 12, that is, a distance by which the nut moves along the central axis C when the nut is rotated around the central axis C for one rotation) to the width for five threads (in other words, 5 times the pitch of the second thread 12, that is, 5 times the distance by which the nut moves along the central axis C when the nut is rotated around the central axis C for one rotation). Also, the maximum value of the thickness of the thin wall piece 14-1 (in other words, (the maximum external diameter of a virtual circle that passes through the plurality of thin wall pieces–the lower hole diameter of a virtual hole formed on the inner side than the plurality of thin wall pieces)/2) is, for example, ⅔ or below of the thickness of the nut (in other words (a width between two surfaces of the nut main section a lower hole diameter of the nut main section 10)/2).

Figure 15:
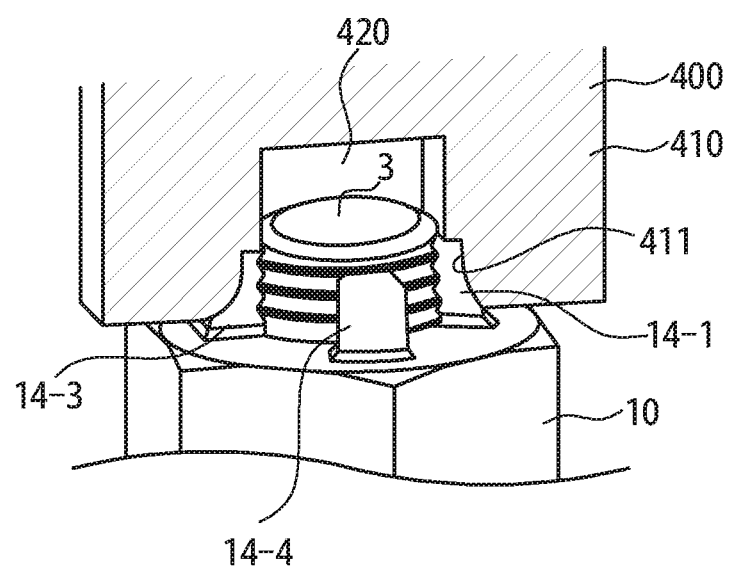
FIG. 15 is a schematic perspective view schematically showing a situation in which the thermoplastic plastic nut of the first modification example is welded to the bolt by using the nut welding device.

The welding method using the thermoplastic plastic nut 1 of the first modification example is same as the welding method using the thermoplastic plastic nut 1 in the above-mentioned embodiments. Therefore, the repetitive description is omitted. To weld the thermoplastic plastic nut 1 of the first modification example to bolt 3, for example, the nut welding device shown in FIG. 8, FIG. 11 or FIG. 12 is enough to be used. FIG. 15 is a perspective view schematically showing the situation of welding the thermoplastic plastic nut 1 of the first modification example to the bolt 3 by using the nut welding device. Note that in FIG. 15, in order to show a situation of the central concave section 420 so as to be easy to understand, a half body on the front side of the welding device main section 400 is shown in a state of being cut.

In this Specification, a combination of the thermoplastic plastic nut 1 of the embodiments or the modification examples and the technique shown in the background art is not excluded.

The present invention is not limited to each of the above embodiments. It would be clear that the embodiments may be changed or modified in the range of the technique thought of the present invention. Also, various techniques used in each of the embodiments or the modification examples are possible to apply to another embodiment or modification example unless any technical contradiction is caused.

This patent application is based on Japanese Patent Application (JP 2016-071486), and claims a priority based on the Application. The disclosure of the Application is incorporated herein by reference.

The invention claimed is:

1. A thermoplastic plastic nut comprising:
a nut main section having a second thread configured to be screwed to a first thread of a bolt; and
a thin wall section configured to be welded to the first thread of the bolt when the bolt is threaded to the second thread of the nut main section and disposed to protrude in a first direction along a central axis of the nut main section from the nut main section,
wherein a material of the nut main section comprises a thermoplastic resin,
wherein a material of the thin wall section comprises the thermoplastic resin, and
wherein a height of the thin wall section in the first direction is equal to or larger than one pitch of the second thread of the nut main section and equal to or smaller than five pitches of the second thread of the nut main section.

2. The thermoplastic plastic nut according to claim 1, wherein the thin wall section comprises a plurality of thin wall pieces protruded in the first direction from the nut main section, and
wherein the plurality of thin wall pieces are arranged around the central axis, adjacent two of the plurality of thin wall pieces being apart from each other.

3. The thermoplastic plastic nut according to claim 1, wherein the thin wall section is annular.

4. The thermoplastic plastic nut according to claim 1, wherein an external side surface of the thin wall section is a surface in which a distance from the central axis becomes small step-by-step or continuously along the first direction.

5. A nut welding device used to weld a thermoplastic plastic nut to a first thread of a bolt, the thermoplastic plastic nut comprising a nut main section having a second thread configured to be screwed to the first thread of the bolt; and a thin wall section to the first thread and disposed to protrude in a first direction along a central axis of the nut main section from the nut main section, wherein a material of the nut main section comprises a thermoplastic resin, wherein a material of the thin wall section comprises the thermoplastic resin, and wherein a height of the thin wall section in the first direction is equal to or larger than one pitch of the second thread of the nut main section and equal to or smaller than five pitches of the second thread of the nut main section, the nut welding device comprising:
a power supply section; and
a welding device main section,
wherein the welding device main section comprises:
a distant section having an inner surface contacting an external side surface of an upper section of the nut; and
an energy generating section configured to generate an energy to be transmitted to the external side surface of the upper section of the nut, and
wherein the inner surface is a surface in which a distance from the central axis of the welding device main section becomes small as heading upwardly.

6. The nut welding device according to claim 5, wherein the distant section has a plurality of prominent pieces which are prominent for the central axis, and
wherein the welding device main section supplies the energy to the thermoplastic plastic nut through the plurality of prominent pieces.

7. The nut welding device according to claim 5, wherein the distant section comprises a guide member configured to abut an external side surface of the nut main section.

8. The nut welding device according to claim 7, further comprising:
a rotation mechanism configured to rotate at least a part of the guide member around the central axis.

9. A nut welding method for welding a thermoplastic nut to a first thread of a bolt, the thermoplastic plastic nut comprising a nut main section having a second thread configured to be screwed to the first thread of the bolt; and a thin wall section to the first thread and disposed to protrude in a first direction along a central axis of the nut main section from the nut main section, wherein a material of the nut main section comprises a thermoplastic resin, wherein a material of the thin wall section comprises the thermoplastic resin, and wherein a height of the thin wall section in the first direction is equal to or larger than one pitch of the second thread of the nut main section and equal to or smaller than five pitches of the second thread of the nut main section, the nut welding method comprising:
installing a thermoplastic plastic nut to a thermoplastic plastic bolt;
moving down a welding device main section such that the welding device main section contacts a nut upper section as an upper section of the thermoplastic plastic nut; and
welding the nut upper section to the first thread of the thermoplastic plastic bolt by transmitting energy to the nut upper section from the welding device main section.

10. The nut welding method according to claim 9, wherein the nut upper section is a thin wall section configured to protrude upwardly from the nut main section.

11. The thermoplastic plastic nut according to claim 2, wherein the plurality of thin wall pieces is arranged at regular intervals.

* * * * *